(12) United States Patent  
Nowicki et al.

(10) Patent No.: US 12,110,999 B2  
(45) Date of Patent: Oct. 8, 2024

(54) FLUID CONNECTION ASSEMBLY

(71) Applicant: Oetiker NY, Inc., Lancaster, NY (US)

(72) Inventors: Eric Nowicki, Buffalo, NY (US); Kristian James Hagen, Gasport, NY (US); Hayden Allis, Albion, NY (US)

(73) Assignee: Oetiker NY, Inc., Lancaster, NY (US)

( * ) Notice: Subject to any disclaimer, the term of this patent is extended or adjusted under 35 U.S.C. 154(b) by 3 days.

(21) Appl. No.: 18/246,879

(22) PCT Filed: Oct. 21, 2021

(86) PCT No.: PCT/US2021/071953  
§ 371 (c)(1),  
(2) Date: Mar. 28, 2023

(87) PCT Pub. No.: WO2022/094524  
PCT Pub. Date: May 5, 2022

(65) Prior Publication Data  
US 2023/0258290 A1    Aug. 17, 2023

Related U.S. Application Data

(63) Continuation-in-part of application No. PCT/US2021/035393, filed on Jun. 2, 2021, which is a continuation-in-part of application No. PCT/US2020/057312, filed on Oct. 26, 2020.

(51) Int. Cl.  
*F16L 37/12* (2006.01)  
*F16L 37/088* (2006.01)

(52) U.S. Cl.  
CPC ....... *F16L 37/1225* (2013.01); *F16L 37/0885* (2019.08); *F16L 2201/10* (2013.01)

(58) Field of Classification Search  
CPC ............... F16L 2201/10; F16L 37/0885; F16L 37/1225  
See application file for complete search history.

(56) References Cited

U.S. PATENT DOCUMENTS

| | | |
|---|---|---|
| 4,640,534 A | 2/1987 | Hoskins et al. |
| 4,753,458 A | 6/1988 | Case et al. |
| 5,297,818 A | 3/1994 | Klinger |
| 5,459,500 A | 10/1995 | Klinger et al. |
| 5,468,028 A | 11/1995 | Olson |
| 5,472,242 A | 12/1995 | Petersen |
| 5,584,411 A | 12/1996 | Channell et al. |
| 5,647,612 A | 7/1997 | Yoshida et al. |
| 5,681,061 A | 10/1997 | Olson |
| 5,842,450 A | 12/1998 | Fort et al. |
| 5,909,901 A | 6/1999 | Zillig et al. |

(Continued)

FOREIGN PATENT DOCUMENTS

| | | |
|---|---|---|
| CN | 104884853 | 9/2015 |
| CN | 111594624 | 8/2020 |

(Continued)

*Primary Examiner* — Zachary T Dragicevich  
(74) *Attorney, Agent, or Firm* — Harter Secrest & Emery LLP; Michael Nicholas Vranjes (57) ABSTRACT

A retainer for a fluid connection assembly, including a first end, a second end, a first section, a second section displaceable with respect to the first section, a radially inward facing surface, a radially outward facing surface, and an indicator slidably connected to the first section.

20 Claims, 5 Drawing Sheets

(56) References Cited

U.S. PATENT DOCUMENTS

| | | |
|---|---|---|
| 5,979,946 A | 11/1999 | Petersen et al. |
| 6,481,086 B1 | 11/2002 | Davidson |
| 6,880,859 B2 | 4/2005 | Breay et al. |
| 6,913,294 B2 | 7/2005 | Treverton et al. |
| 7,128,347 B2 | 10/2006 | Kerin |
| 7,240,930 B2 | 7/2007 | Stravitz |
| 7,300,078 B2 | 11/2007 | Yamamoto et al. |
| 7,364,207 B2 | 4/2008 | McGee et al. |
| 7,497,477 B2 | 3/2009 | Pepe |
| 7,631,905 B2 | 12/2009 | McGee et al. |
| 7,802,822 B2 | 9/2010 | Poder et al. |
| 7,828,338 B2 | 11/2010 | Kertesz et al. |
| 7,963,570 B2 | 6/2011 | Swift et al. |
| 8,375,550 B2 | 2/2013 | Swift et al. |
| 10,221,976 B2 | 3/2019 | Kujawski et al. |
| 10,273,996 B2 | 4/2019 | Whitaker et al. |
| 10,281,075 B2 | 5/2019 | Hontz et al. |
| 10,738,926 B2 | 8/2020 | Stieler |
| 11,092,269 B2 | 8/2021 | Kujawski, Jr. et al. |
| 2008/0111376 A1 | 5/2008 | Ferrero |
| 2009/0091125 A1 | 4/2009 | Takeda et al. |
| 2009/0119886 A1 | 5/2009 | Werth |
| 2010/0032937 A1* | 2/2010 | Kerin .................... F16L 37/144 |
| 2011/0006517 A1 | 1/2011 | Nakata |
| 2011/0101674 A1 | 5/2011 | Benvenuto et al. |
| 2012/0104746 A1* | 5/2012 | Fansler ............... F16L 37/0885 |
| 2014/0210202 A1 | 7/2014 | Hess et al. |
| 2016/0363247 A1 | 12/2016 | McCure |
| 2017/0114935 A1 | 4/2017 | Kujawski, Jr. et al. |
| 2017/0254453 A1 | 9/2017 | Fremont et al. |
| 2018/0328525 A1 | 11/2018 | Kerin, Jr. |
| 2019/0063656 A1 | 2/2019 | Kujawski, Jr. |
| 2022/0049731 A1* | 2/2022 | You .......................... F16B 2/08 |

FOREIGN PATENT DOCUMENTS

| | | |
|---|---|---|
| CN | 212251624 | 12/2020 |
| DE | 102011121828 A1 | 6/2013 |
| EP | 1939514 | 7/2008 |
| EP | 3361134 | 8/2018 |
| EP | 3430302 | 4/2020 |
| JP | 4703885 | 6/2011 |
| JP | 5743765 | 7/2015 |
| JP | 2021001626 | 1/2021 |

\* cited by examiner

FLUID CONNECTION ASSEMBLY

CROSS-REFERENCE TO RELATED APPLICATIONS

The present application is the U.S. National Stage Application pursuant to 35 U.S.C. § 371 of International Patent Application No. PCT/US2021/071953, filed on Oct. 21, 2021, which application claims the benefit under Articles 4 and 8 of the Stockholm Act of the Paris Convention for the Protection of Industrial Property of International Patent Application No. PCT/US2021/035393, filed on Jun. 2, 2021, and International Patent Application No. PCT/US2020/057312, filed on Oct. 26, 2020, which applications are hereby incorporated by reference herein in their entireties.

FIELD

The present disclosure relates to fluid connectors, and more particularly, to a fluid connection assembly including a retainer that decreases the insertion force required for assembly and allows for quick assembly without the need for tools, and even more particularly, to a retainer including a device that indicates a status of the fluid connection assembly.

BACKGROUND

Fluid connectors, fluid connections, and fluid connection assemblies are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube when the tube is fully inserted into the connector body. However, in order for the fluid connector to properly function, slots or apertures must be machined in the connector body such that the retaining clip can protrude therethrough and engage the tube, which requires extra post-process manufacturing. During the assembly process, installation of the retaining clip onto the connector body is difficult and failure to install the retaining clip properly can jeopardize the structural integrity of the retaining clip. Additionally, the force required to engage the tube into the connector body, and overcome the radial force of the retaining clip, is very large with current designs. Also, since the retaining clips are very thin and small, it is easy to lose them if dropped or misplaced. Furthermore, some connection assembly solutions take a long time to secure and require tools for the assembly process. Moreover, current connection assembly solutions do not indicate the connection state of the assembly.

Thus, there has been a long-felt need for a fluid connection assembly including a retainer that allows for disassembly, eliminates the need for post-process machining, and reduces the insertion force required to assemble the fluid connector. There has also been a long-felt need for a fluid connection assembly that indicates the connection status of the tube in the connector body and retainer.

SUMMARY

According to aspects illustrated herein, there is provided a retainer for a fluid connection assembly, comprising a first end, a second end, a first section, a second section displaceable with respect to the first section, a radially inward facing surface, a radially outward facing surface, and an indicator slidably connected to the first section.

In some embodiments, the retainer further comprises a hole extending radially inward from the radially outward facing surface. In some embodiments, the indicator is arranged in the hole. In some embodiments, the hole comprises at least one axial flange arranged therein. In some embodiments, the at least one axial flange is arranged radially between and spaced apart from the radially outward facing surface and the radially inward facing surface. In some embodiments, the indicator comprises a base arranged radially within the radially inward facing surface, a shaft connected to the base, and a head connected to the shaft. In some embodiments, the indicator further comprises at least one arm pivotably connected to the base, and the at least one arm is operatively arranged to bias the indicator radially inward with respect to the radially inward facing surface. In some embodiments, the at least one arm is operatively arranged to engage the at least one flange. In some embodiments, in a fully assembled locked state the head protrudes radially outward from the radially outward facing surface, and in a partially assembled locked state the head does not protrude radially outward from the radially outward facing surface. In some embodiments, the retainer further comprises a first flange extending radially inward from the radially inward facing surface at the first end, and a second flange extending radially inward from the radially inward facing surface at the second end. In some embodiments, the indicator is arranged in the second flange. In some embodiments, the first flange comprises a first width, the second flange comprises a second width, and the second width is greater than the first width.

According to aspects illustrated herein, there is provided a fluid connection assembly, comprising a connector body, including a first end, a second end, a through-bore, and a first radially outward facing surface comprising a groove, and a retainer operatively arranged to be removably connected to the connector body, the retainer including a third end, a fourth end, a first section, a second section displaceable with respect to the first section, a radially inward facing surface, a second radially outward facing surface, a hole extending from the second radially outward facing surface to the radially inward facing surface, and an indicator slidably arranged in the hole.

In some embodiments, the hole comprises at least one flange arranged therein. In some embodiments, the indicator comprises a base arranged radially within the radially inward facing surface, a shaft connected to the base, and a head connected to the shaft. In some embodiments, the indicator further comprises at least one arm pivotably connected to the base, and the at least one arm is operatively arranged to bias the indicator radially inward with respect to the radially inward facing surface. In some embodiments, the at least one arm is operatively arranged to engage the at least one flange. In some embodiments, in a fully assembled locked state the head protrudes radially outward from the radially outward facing surface, and in a partially assembled locked state the head does not protrude radially outward from the radially outward facing surface. In some embodiments, the retainer further comprises a first flange extending radially inward from the radially inward facing surface at the first end, and a second flange extending radially inward from the radially inward facing surface at the second end, wherein the indicator is arranged in the second flange. In some embodiments, the first flange comprises a first width, the second flange comprises a second width, and the second width is greater than the first width.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

"Fully assembled locked state" as used herein refers to the fluid connection assembly and indicates that the tube is fully connected to the connector body and the retainer is fully connected to the connector body to retain the tube therein. "Partially assembled locked state" as used herein refers to the fluid connection assembly and indicates that the retainer is fully connected to the connector body but the tube is not arranged in the connector body or the retainer. The retainer may also be described as having a "locked state" or an "unlocked state," which indicates the state of the retainer independent of the connector body and the tube.

Figure 1:
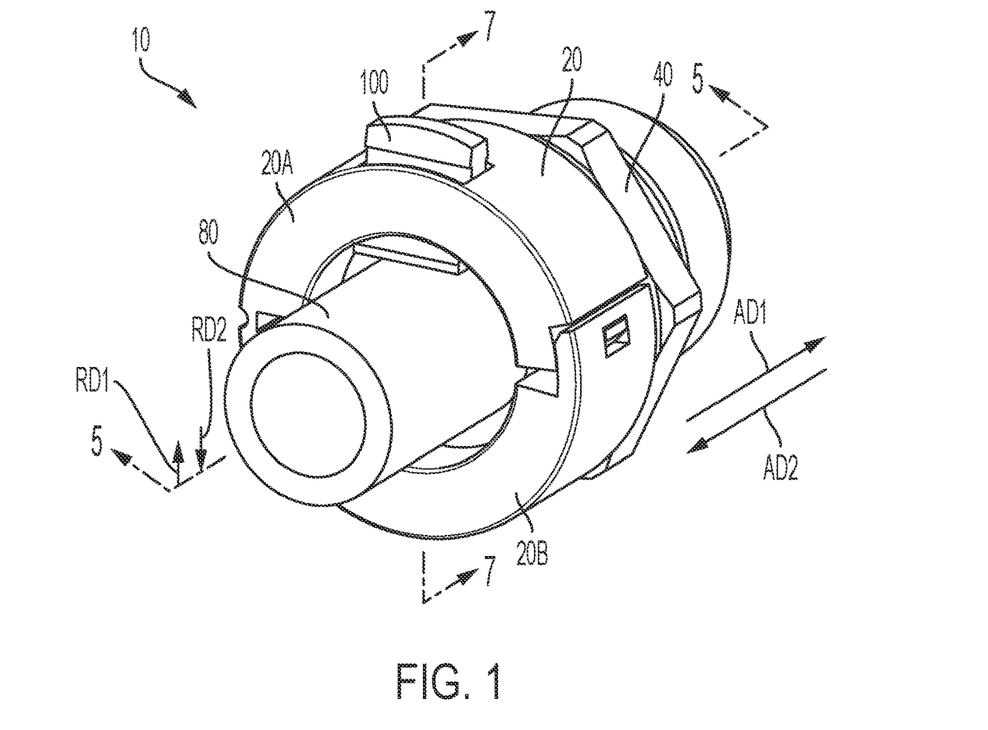
FIG. 1 is a perspective view of a fluid connection assembly, in a fully assembled locked state.
Figure 2:
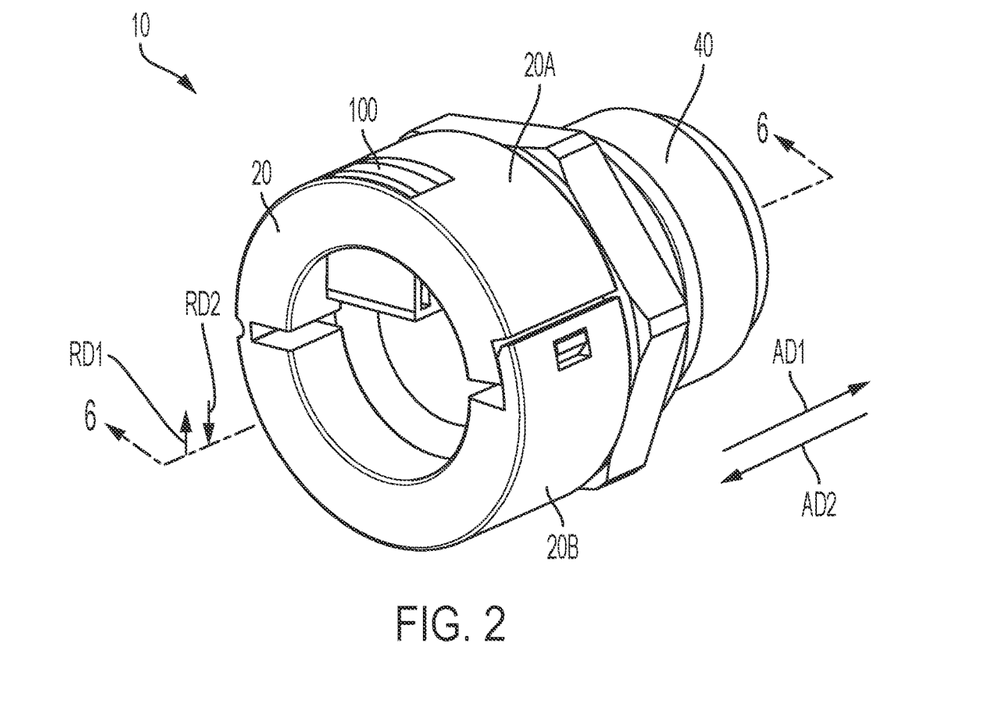
FIG. 2 is a perspective view of the fluid connection assembly shown in FIG. 1, in a partially assembled locked state.
Figure 3:
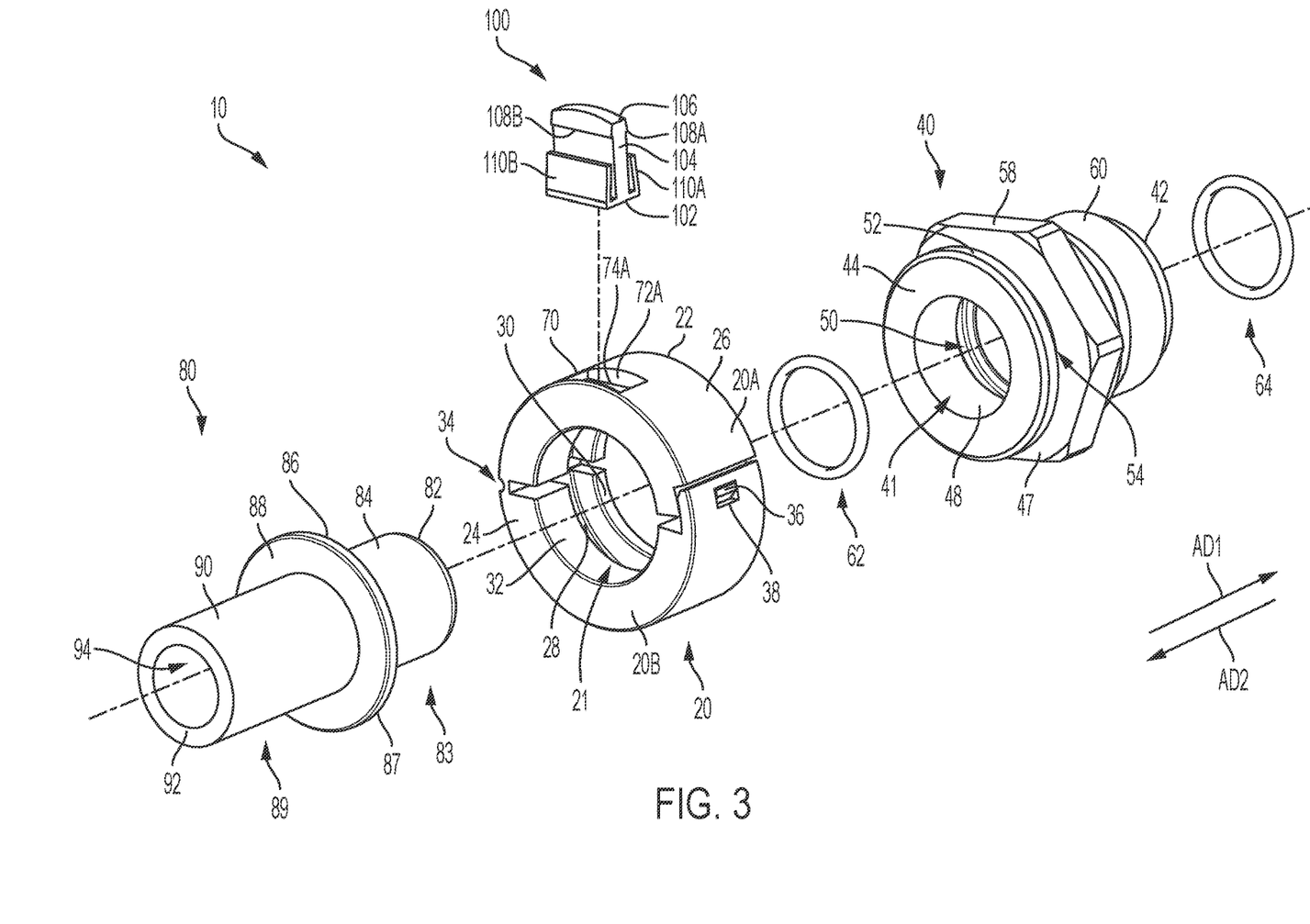
FIG. 3 is an exploded perspective view of the fluid connection assembly shown in FIG. 1.

Adverting now to the figures, FIG. 1 is a perspective view of fluid connection assembly 10, in a fully assembled locked state. FIG. 2 is a perspective view of fluid connection assembly 10, in a partially assembled locked state (i.e., with tube 80 removed). FIG. 3 is an exploded perspective view of fluid connection assembly 10. Fluid connection assembly 10 generally comprises retainer 20, tube 80, connector body 40, and indicator 100. The following description should be read in view of FIGS. 1-3.

Tube 80 comprises end 82, section 83, bead or shoulder 87, section 89, end 82, and through-bore 94. Through-bore 94 extends through tube 80 from end 82 to end 92. Section 183 is arranged between end 82 and shoulder 87 and comprises radially outward facing surface 84. Radially outward facing surface 84 includes a substantially constant diameter. In some embodiments, radially outward facing surface 84 comprises a frusto-conical taper or curvilinear surface proximate end 82 (see FIG. 5). Shoulder 87 is arranged between section 83 and section 89 and comprises surface 86 and surface 88. In some embodiments, surface 86 is an axial surface facing at least partially in axial direction AD1 and surface 88 is an axial surface facing at least partially in axial direction AD2. In some embodiments, surface 86 is a frusto-conical surface extending from the radially outward facing surface of shoulder 87 radially inward in axial direction AD1. For example, surface 86 may be a linear conical shape and increase in diameter in axial direction AD2. In some embodiments, surface 86 may comprise a linear portion and a conical or frusto-conical portion. Section 89 is arranged between shoulder 87 and end 92 and comprises radially outward facing surface 90. Radially outward facing surface 90 includes a substantially constant diameter. Tube 80 is arranged to be inserted, specifically with end 82 first, into connector body 40. Tube 80 is inserted into connector body 40 until section 83, or radially outward facing surface 84, engages seal 62 (see FIG. 5). Shoulder 87 engages end 44, more specifically, surface 86 abuts against and/or engages end 44, at which point retainer 20 is assembled to secure tube 80 to connector body 40, as will be described in greater detail below. It should be appreciated that tube 80 may be any traditional tube or tube end form comprising a bead, radially outward extending protrusion or flange, or ramp profile, which extends radially outward and axially on the outer surface of the tube, to secure the tube within the connector body. In some embodiments, tube 80 comprises a metal, a polymer, and/or a ceramic.

Figure 4:
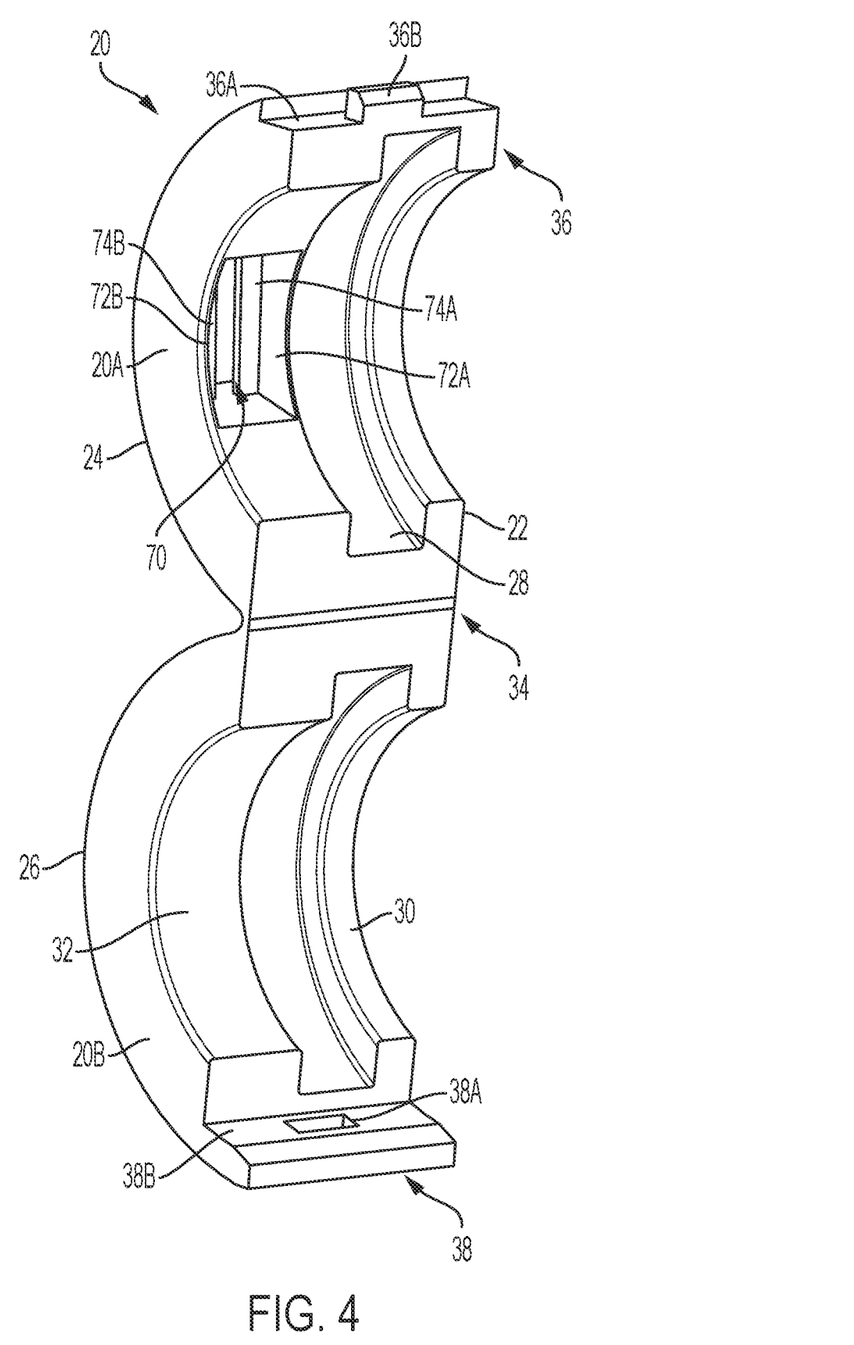
FIG. 4 is a perspective view of the retainer shown in FIG. 1, in an unlocked state.
Figure 5:
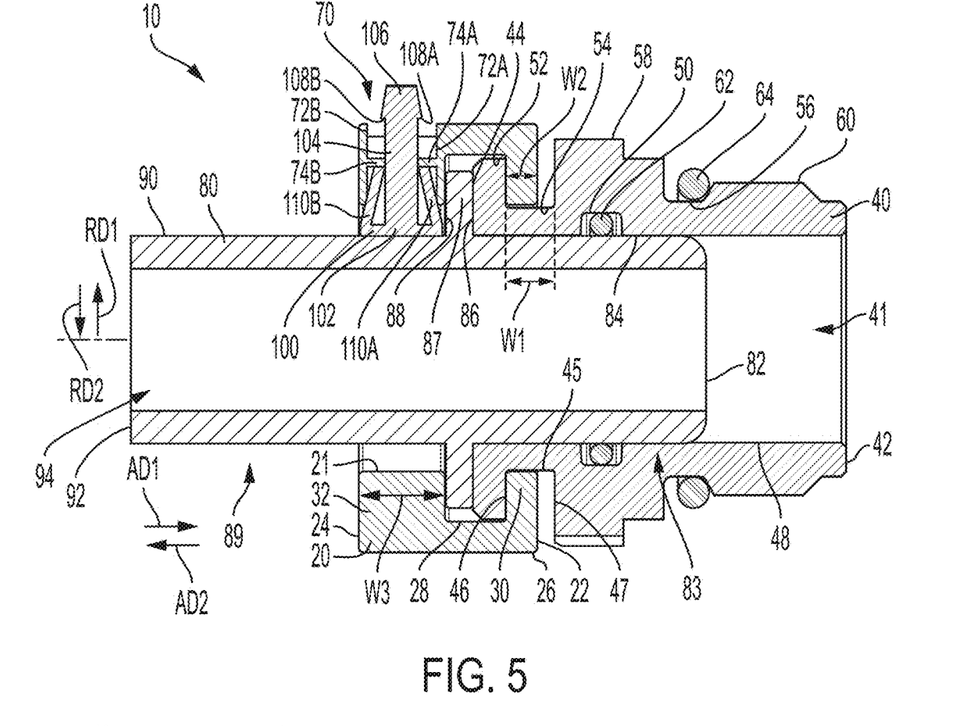
FIG. 5 is a cross-sectional view of the fluid connection assembly taken generally along line 5-5 in FIG. 1.
Figure 6:
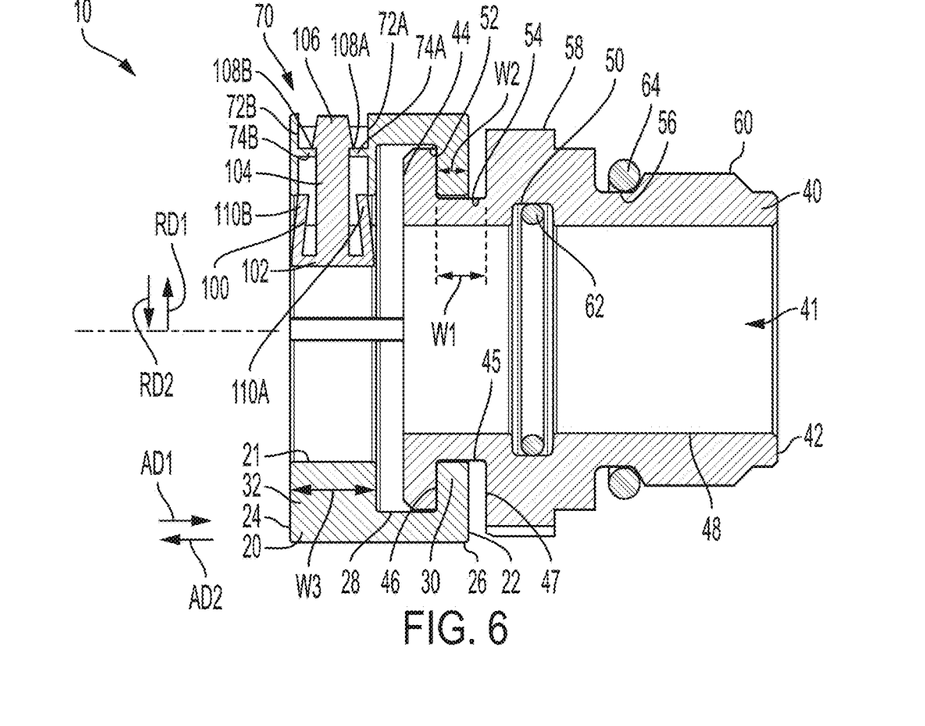
FIG. 6 is a cross-sectional view of the fluid connection assembly taken generally along line 6-6 in FIG. 2; and, FIG. 7 is a cross-sectional view of the fluid connection assembly taken generally along line 7-7 in FIG. 1.
Figure 7:
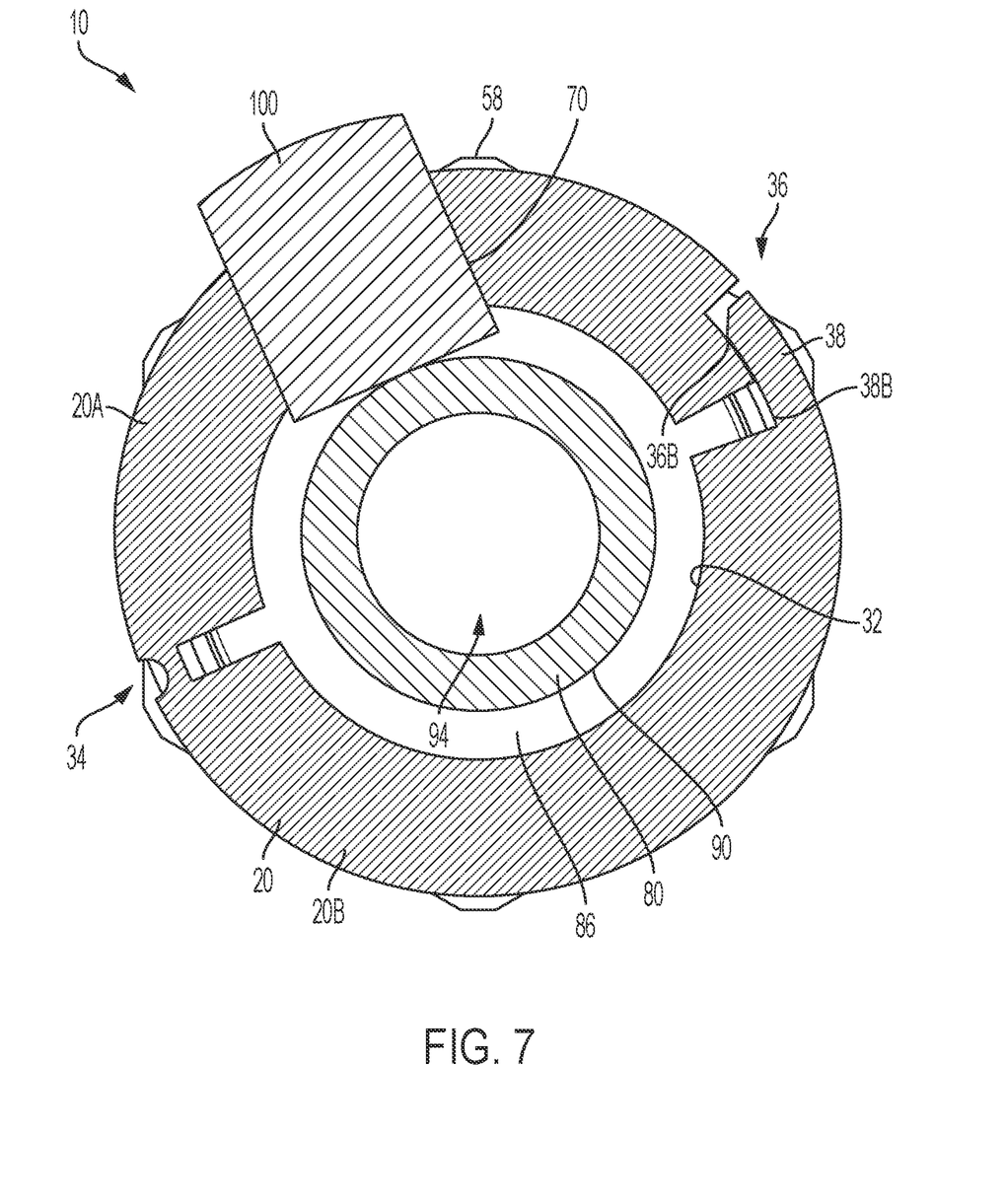

FIG. 4 is a perspective view of retainer 20, in an unlocked state. FIG. 5 is a cross-sectional view of fluid connection assembly 10 taken generally along line 5-5 in FIG. 1. FIG. 6 is a cross-sectional view of fluid connection assembly 10 taken generally along line 6-6 in FIG. 2. FIG. 7 is a cross-sectional view of fluid connection assembly 10 taken generally along line 7-7 in FIG. 1. The following description should be read in view of FIGS. 1-7.

Retainer 120 generally comprises section 20A, section 20B, end 22, end 24, hole 21 extending from end 22 to end 24, radially outward facing surface 26, and radially inward facing surface 28. In some embodiments, section 20A is hingedly connected to section 20B, via, for example, hinge 34. In some embodiments, hinge 34 is a living hinge. In some embodiments, section 20A is removably connected to section 20B. When sections 20A and 20B are connected or retainer 20 is in the locked state (FIGS. 1-3), hole 21 is formed therebetween; however, it should be appreciated that even in the unlocked state (FIG. 4), it could be said that each of sections 20A and 20B include a respective hole 21.

Radially inward facing surface 28 extends from end 22 and is operatively arranged to engage radially outward facing surface 52. Radially inward facing surface 28 comprises flange 30 extending radially inward therefrom. Flange 30 is arranged immediately adjacent end 22. Flange 30 is operatively arranged to engage groove 54 and radially inward facing surface 28 is operatively arranged to engage radially outward facing surface 52 to connect retainer 20 to connector body 40. Radially inward facing surface 28 further comprises flange 32 extending radially inward therefrom. Flange 32 is arranged immediately adjacent end 24. Flange 32 is operatively arranged to engage shoulder 87 to connect tube 80 to connector body 40. Flange 30 comprises width W2 and flange 32 comprises width W3. In some embodiments, width W3 is greater than width W2.

As best seen in FIG. 5, flange 32 is spaced apart from flange 30 by a first distance. Groove 54 is spaced apart from end 44 by a second distance. Shoulder 87 comprises a width equal to a third distance. The first distance is substantially equal to the sum of the second distance and the third distance. This design results in, when retainer 20 is connected to connector body 40 and tube 80, flange 32 abutting against surface 88, as well as surface 86 abutting against end 44 (i.e., retainer 20 clamps shoulder 87 to end 44). In some embodiments, the first distance is less than the sum of the second distance and the third distance. This results in shoulder 87 and connector body 40 being squeezed or clamped together. In some embodiments, the first distance is greater than the sum of the second distance and the third distance such that shoulder 87 is engaged or in close proximity with connector body 40. Additionally, flange 30 comprises width W2 and groove 54 comprises width W1, width W2 being less than width W1. As such, when retainer 20 is connected to connector body 40 without tube 80, retainer 20 is capable of sliding or displacing in axial direction AD1 and axial direction AD2 with respect to connector body 40. When tube 80 is properly secured to connector body 40 by retainer 20, retainer 20 is not capable of displacing in axial direction AD1 and axial direction AD2 with respect to connector body 40. This feature provides an indicator as to the connection status of fluid connection assembly 10 and will be described in greater detail below. In some embodiments, width W2 is substantially equal to width W1.

Flange 32 comprises a first diameter and shoulder 87 comprises a second diameter. The first diameter is less than the second diameter, which thus prevents shoulder 87 from being removed from connector body 40, or tube 80 from displacing in axial direction AD2 or rotating (i.e., bending moment) relative to connector body 40. In some embodiments, radially inward facing surface 28 comprises a third diameter equal to the second diameter, which prevents shoulder 87 from displacing in radial direction RD1 or radial direction RD2 with respect to connector body 40.

Section 20A comprises male connector 36 and section 20B comprises female connector 38. As shown, male connector 36 on section 20A is arranged to engage female connector 38 on section 20B such that sections 20A and 20B are fixedly secured. In some embodiments, male connector 36 is hook-shaped (in a radially outward direction) and includes groove 36A and projection 36B. Groove 36A is arranged in radially outward facing surface 26. Projection 36B extends generally radially outward in radial direction RD1 from groove 36A. In some embodiments, projection 36B comprises a tapered section near its radially outermost end operatively arranged to allow engagement of projection 36B with female connector 38, specifically, aperture 38A, to occur with greater ease.

Female connector 38 comprises aperture 38A extending radially inward from radially outward facing surface 26. Aperture 38A is operatively arranged to engage projection 36B to lock section 20B to section 20A. Female connector 38 further comprises recess 38B. In some embodiments, recess 38B is arranged in radially inward facing surface 28 (i.e., extends radially outward from radially inward facing surface 28). As section 20B is displaced toward section 20A, female connector 38 engages projection 36B and displaces radially outward in radial direction RD1. Once aperture 38A is aligned with projection 36B, female connector 38 snaps back radially inward, in radial direction RD2, thereby securing section 20B to section 20A.

Retainer 20 further comprises hole 70 extending radially inward from radially outward facing surface 26. Hole 70 is axially arranged on flange 32. In some embodiments, hole 70 is arranged axially between and spaced apart from the ends of flange 32 (i.e., end 24 and radially inward facing surface 28). Hole 70 comprises axial surface 72A and axial surface 72B. Flange 74A is arranged radially between radially outward facing surface 26 and the radially inward facing surface of flange 32. Flange 74A extends from axial surface 72A in axial direction AD2. Flange 74B is arranged radially between radially outward facing surface 26 and the radially inward facing surface of flange 32. Flange 74B extends from axial surface 72B in axial direction AD1. An axial space exists between flange 74A and flange 74B, as best seen in FIGS. 5-6. It should be appreciated that while the drawings illustrate hole 70 arranged on section 20A, in some embodiments hole 70 may be arranged on section 20B. In some embodiments, both sections 20A and 20B include a hole 70. In some embodiments, retainer 20 comprises a metal, a polymer, and/or a ceramic.

Indicator or indicator tab 100 is slidably connected to retainer 20, specifically, indicator 100 is slidably arranged in hole 70. Indicator 100 comprises base 102, shaft 104, and head 106. Shaft 104 comprises a first end fixedly secured to base 102 and a second end fixedly secured to head 106. Shaft 104 comprises a width that is less than the width of base 102 and less than the width of head 106, in axial direction AD1 and axial direction AD2 (see FIGS. 5-6). As such, ledges 108A-B are formed on either axial side of shaft 104. Ledges 108A-B are operatively arranged to engage flanges 74A-B, respectively, to prevent indicator 100 from being removed from retainer 20 in radial direction RD2. Shaft 104 is slidably arranged between flanges 74A and 74B. Indicator 100 is prevented from being removed from retainer 20 in radial direction RD1 by base 102 and/or arms 110A-B. Arm 110A is pivotably connected to a first end of base 102 and is engaged with axial surface 72A. Arm 110B is pivotably connected to a second end of base 102 and is engaged with axial surface 72B. Arms 110A-B generally act as springs that bias indicator 100 in radial direction RD2 relative to retainer 20. In some embodiments, indicator 100 and all of its components are integrally formed.

When fluid connection assembly 10 is in the partially assembled locked state as shown in FIGS. 2 and 6, arm 110A is engaged with axial surface 72A and arm 110B is engaged with axial surface 72B such that retainer 100 is displaced in radially direction RD2 and ledges 108A-B are engaged with and/or abut against flanges 74A-B. Head 106 does not protrude from radially outward facing surface 26 of retainer 20. Furthermore, shaft 104 is not visible radially outward of radially outward facing surface 26.

When fluid connection assembly 10 is in the fully assembled locked state as shown in FIGS. 1 and 5, indicator 100 is displaced in radial direction RD1 by tube 80, thereby forcing arms 110A-B to be bent toward shaft 104. Arm 110A is engaged with axial surface 72A and flange 74A and arm 110B is engaged with axial surface 72B and flange 74B. In some embodiments, arms 110A-B are also engaged with shaft 104. The engagement of arms 110A-B with flanges 74A-B prevents indicator 100 from being removed from retainer 20 in radial direction RD1. Head 106 protrudes radially outward from radially outward facing surface 26 of retainer 20. Furthermore, shaft 104 is visible radially outward of radially outward facing surface 26. In some embodiments, shaft 104 comprises a color (e.g., green, yellow, white, etc.) that is different than that of retainer 20 such that, when shaft 104 protrudes radially outward therefrom it is easily visible. This leads to a user being able to easily visually detect whether fluid connection assembly 10 is in the fully assembled locked state.

Connector body 40 comprises through-bore 41 extending from end 42 to end 44, radially inward facing surface 48, groove 50, radially outward facing surface 52, groove 54, head 58, and radially outward facing surface 60. Connector body 40 is arranged to be connected to a component that is filled with a fluid or through which fluid flows. For example, connector body 40 may be connected to a refrigeration compressor or a transmission via radially outward facing surface 60, which may comprise external threading. Connector body 40 may be screwed into a threaded hole in the compressor via head 58 (e.g., using a wrench), which is then filled with refrigerant fluid. In some embodiments, head 58 is hexagonal; however, it should be appreciated that head 58 may comprise any geometry suitable for applying torque to connector body 40. Another component in which fluid connector 10, specifically connector body 40, may be installed in is a condenser, evaporator, or pump. It should be appreciated that fluid connection assembly 10 may be used in various other components, assemblies, and subassemblies in which fluid connection is desired. Radially outward facing surface 60 may further comprise groove 56. Seal or O-ring 64 is arranged in groove 56 to create a fluid tight seal between connector body 40 and the component it is connected to. Seal 62 is arranged in connector body 40. Specifically, seal 62 is arranged in groove 50 to engage tube 80 (i.e., radially outward facing surface 84). Groove 50 is arranged in radially inward facing surface 48. In some embodiments, seal 62 is an O-ring. In some embodiments, radially inward facing surface 48 is a substantially cylindrical surface. End 44 is operatively arranged to engage shoulder 87, specifically, to prevent axial displacement of tube 80 is axial direction AD1.

Groove 54 is arranged in radially outward facing surface 52. Groove 54 is arranged axially between end 44 and head 58. Groove 54 comprises radially outward facing surface 45, surface 46, and surface 47. Radially outward facing surface 45 comprises a diameter that is less than the diameter of radially outward facing surface 52. Surface 46 extends radially outward from radially outward facing surface 45 and faces in axial direction AD1. Surface 47 extends radially outward from radially outward facing surface 45 and faces in axial direction AD2. In some embodiments, surface 46 and/or surface 47 are arranged perpendicular to radially outward facing surface 45. In some embodiments, groove 54 is arranged axially between and spaced apart from end 44 and head 58. In some embodiments, and as shown, groove 54 is arranged immediately adjacent head 58. Groove 54 is operatively arranged to engage with flange 30 to connect retainer 20 to connector body 40.

Groove 54 comprises width W1 that is greater than width W2 of flange 30. In the partially assembled locked state, when retainer 20 is connected to connector body 40, without tube 80 properly connected or present at all, flange 30 and thus retainer 20 is displaceable in axial direction AD1 and axial direction AD2 with respect to groove 54, and thus connector body 40 (i.e., flange 30 can slide back and forth between surface 46 to and surface 47). This provides an indication that fluid connection assembly 10 is not properly assembled. When retainer 20 is connected to connector body 40, with tube 80 properly connected, flange 30 and thus retainer 20 is not displaceable in axial direction AD1 and axial direction AD2 with respect to groove 54, and thus connector body 40 (i.e., flange 30 abuts against surface 46 as shown in FIG. 5). In some embodiments, connector body 40 comprises a metal, a polymer, and/or a ceramic.

To assemble fluid connection assembly 10, tube 80 is inserted in axial direction AD1, with end 82 first, into connector body 40. Radially outward facing surface 84 engages seal 62 and section 83 is arranged inside of connector body 40 proximate radially inward facing surface 48. Shoulder 87 engages end 44 of connector body 40, specifically, surface 86 abuts against end 44. In some embodiments, and as shown, shoulder 87 resides completely outside of connector body 40. Then, retainer 20 is secured over both connector body 40 and tube 80. Specifically, sections 20A and 20B are arranged over connector body 40 such that flange 30 is at least partially aligned with groove 54 and flange 32 is at least partially aligned with surface 88. Sections 20A and 20B are displaced radially inward toward each other (i.e., in radial direction RD2) until female connector 38 fully engages male connector 36 and retainer 20 is in the locked state. Additionally, base 102 engages tube 80, specifically radially outward facing surface 90, thereby displacing indicator 100 in radial direction RD1 with respect to retainer 20.

In the fully assembled locked state, flange 30 engages groove 54, radially inward facing surface 28 engages radially outward facing surface 52, flange 32 engages shoulder 87 of tube 80, base 102 engages radially outward facing surface 90, and head 106 and shaft 104 protrude radially outward from radially outward facing surface 26 of retainer 20. In some embodiments, in the fully assembled locked state, flange 30 abuts against surface 46, flange 32 abuts against surface 88, and surface 86 abuts against end 44. In some embodiments, in the fully assembled locked state, flange 30 abuts against radially outward facing surface 45, thus preventing radial or circumferential displacement of retainer 20 with respect to connector body 40. In some embodiments, flange 32 engages radially outward facing surface 90. The engagement of tube 80 with connector body 40 prevents axial displacement of tube 80 in axial direction AD1 and the engagement of retainer 20 with connector body 40 and tube 80 prevents axial displacement of tube 80 in axial direction AD2, as well as radial directions RD1 and RD2, relative to connector body 40.

To disassemble, female connector 38 is displaced radially outward in radial direction RD1 with respect to male connector 36 until aperture 38A disengages projection 36B. Sections 20A and 20B are then separated to disengage flange 32 from shoulder 87, at which point tube 80 can be removed from connector body 40. Additionally, arms 110A-B force indicator 100 in radial direction RD2 with respect to retainer 20 such that head 106 and shaft 104 no longer protrude radially outward from radially outward facing surface 26.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Fluid connection assembly
20 Retainer
20A Section
20B Section
21 Hole
22 End
24 End
26 Radially outward facing surface
28 Radially inward facing surface
30 Flange
32 Flange
34 Hinge
36 Male connector
36A Groove
36B Projection
38 Female connector
38A Aperture
38B Recess
40 Connector body
41 Through-bore
42 End
44 End
45 Radially outward facing surface
46 Axial surface
47 Axial surface
48 Radially inward facing surface
50 Groove
52 Radially outward facing surface
54 Groove
56 Groove
58 Head
60 Radially outward facing surface
62 Seal
64 Seal
70 Hole
72A Axial surface
72B Axial surface
74A Flange
74B Flange
80 Tube
82 End
83 Section
84 Radially outward facing surface
86 Surface
87 Shoulder or bead
88 Surface
89 Section
90 Radially outward facing surface
92 End
94 Through-bore
100 Indicator
102 Base
104 Shaft
106 Head 108A Ledge
108B Ledge
110A Arm
110B Arm
AD1 Axial direction
AD2 Axial direction
RD1 Radial direction
RD2 Radial direction
W1 Width
W2 Width
W3 Width

What is claimed is:

1. A retainer for a fluid connection assembly, comprising:
a first end;
a second end;
a first section;
a second section displaceable with respect to the first section;
a radially inward facing surface;
a radially outward facing surface;
a hole extending radially inward from the radially outward facing surface, the hole including at least one axial flange arranged therein; and
an indicator arranged in the hole and slidably connected to the first section.

2. The retainer as recited in claim 1, wherein the at least one axial flange is arranged radially between and spaced apart from the radially outward facing surface and the radially inward facing surface.

3. The retainer as recited in claim 1, wherein the indicator comprises:
a base arranged radially within the radially inward facing surface;
a shaft connected to the base; and
a head connected to the shaft.

4. The retainer as recited in claim 3, wherein:
the indicator further comprises at least one arm pivotably connected to the base; and
the at least one arm is operatively arranged to bias the indicator radially inward with respect to the radially inward facing surface.

5. The retainer as recited in claim 4, wherein the at least one arm is operatively arranged to engage the at least one flange.

6. The retainer as recited in claim 3, wherein:
in a fully assembled locked state the head protrudes radially outward from the radially outward facing surface; and
in a partially assembled locked state the head does not protrude radially outward from the radially outward facing surface.

7. The retainer as recited in claim 1, further comprising:
a first flange extending radially inward from the radially inward facing surface at the first end; and
a second flange extending radially inward from the radially inward facing surface at the second end.

8. The retainer as recited in claim 7, wherein the indicator is arranged in the second flange.

9. The retainer as recited in claim 7, wherein:
the first flange comprises a first width;
the second flange comprises a second width; and
the second width is greater than the first width.

10. The retainer as recited in claim 1, wherein the indicator is biased radially inward with respect to the radially outward facing surface.

11. A fluid connection assembly, comprising:
a connector body, including:
a first end;
a second end;
a through-bore; and
a first radially outward facing surface comprising a groove; and
a retainer operatively arranged to be removably connected to the connector body, the retainer including:
a third end;
a fourth end;
a first section;
a second section displaceable with respect to the first section;
a radially inward facing surface;
a second radially outward facing surface;
a hole extending from the second radially outward facing surface to the radially inward facing surface, wherein the hole comprises at least one flange arranged therein; and
an indicator slidably arranged in the hole.

12. The fluid connection assembly as recited in claim 11, wherein the indicator comprises:
a base arranged radially within the radially inward facing surface;
a shaft connected to the base; and
a head connected to the shaft.

13. The fluid connection assembly as recited in claim 12, wherein:
the indicator further comprises at least one arm pivotably connected to the base; and
the at least one arm is operatively arranged to bias the indicator radially inward with respect to the radially inward facing surface.

14. The fluid connection assembly as recited in claim 13, wherein the at least one arm is operatively arranged to engage the at least one flange.

15. The fluid connection assembly as recited in claim 12, wherein:
in a fully assembled locked state the head protrudes radially outward from the radially outward facing surface; and
in a partially assembled locked state the head does not protrude radially outward from the radially outward facing surface.

16. The fluid connection assembly as recited in claim 11, wherein the retainer further comprises:
a first flange extending radially inward from the radially inward facing surface at the first end; and
a second flange extending radially inward from the radially inward facing surface at the second end, wherein the indicator is arranged in the second flange.

17. The fluid connection assembly as recited in claim 16, wherein:
the first flange comprises a first width;
the second flange comprises a second width; and
the second width is greater than the first width.

18. The fluid connection assembly as recited in claim 11, wherein in a first state, the indicator does not protrude from the second radially outward facing surface.

19. The fluid connection assembly as recited in claim 11, wherein the indicator is biased radially inward with respect to the radially outward facing surface.

20. A retainer for a fluid connection assembly, comprising:
a first end;
a second end;

a first section;
a second section displaceable with respect to the first section;
a radially inward facing surface;
a radially outward facing surface; and
an indicator slidably connected to the first section, the indicator including:
  a base arranged radially within the radially inward facing surface;
  a shaft connected to the base; and
  a head connected to the shaft;
wherein:
  in a fully assembled locked state the head protrudes radially outward from the radially outward facing surface; and
  in a partially assembled locked state the head does not protrude radially outward from the radially outward facing surface.

\* \* \* \* \*